R. R. SOLMSON.
PIPE STAMPING MACHINE.
APPLICATION FILED JAN. 17, 1922.

1,426,784.

Patented Aug. 22, 1922.
2 SHEETS—SHEET 1.

Inventor
Robert R. Solmson
By George C. Prevot.
Attorney

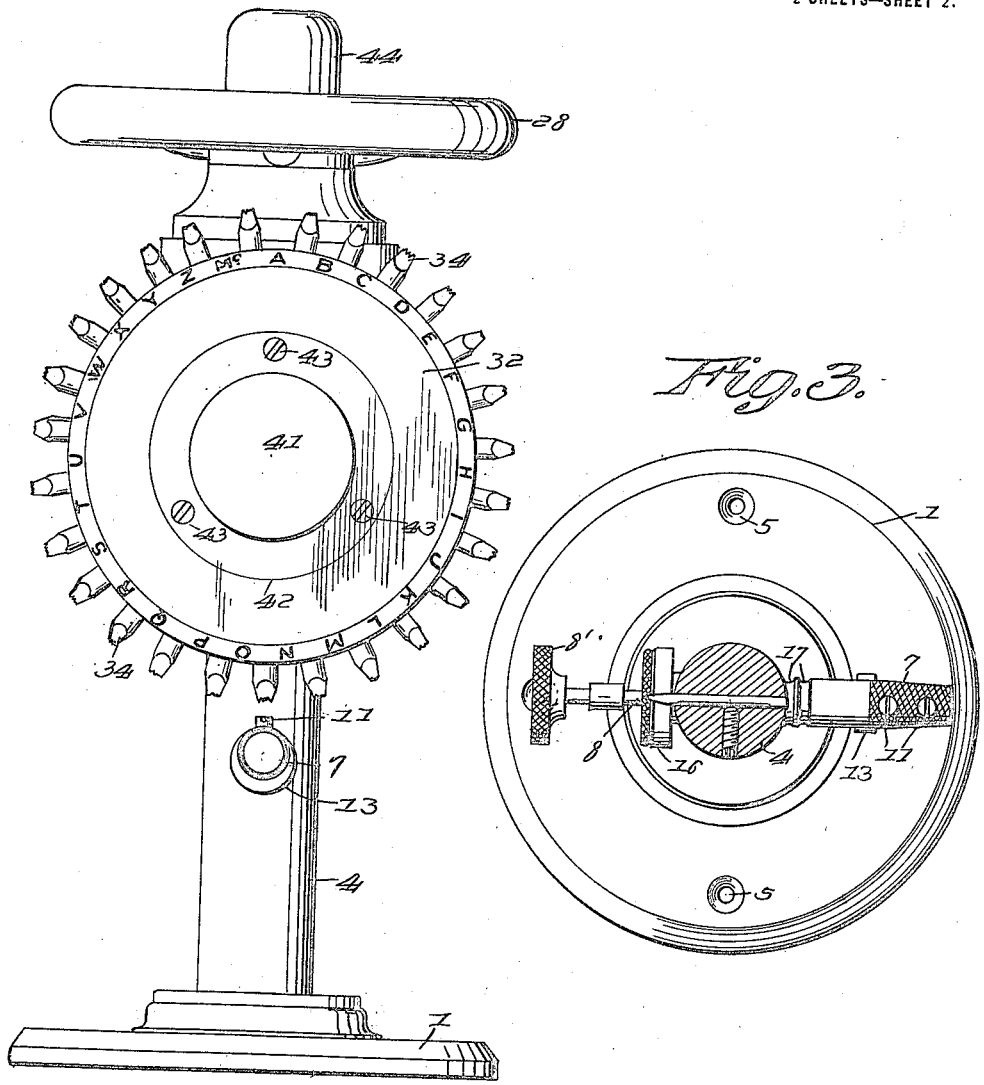

UNITED STATES PATENT OFFICE.

ROBERT R. SOLMSON, OF NEW BRUNSWICK, NEW JERSEY.

PIPE-STAMPING MACHINE.

1,426,784.   Specification of Letters Patent.   Patented Aug. 22, 1922.

Application filed January 17, 1922. Serial No. 529,853.

*To all whom it may concern:*

Be it known that I, ROBERT R. SOLMSON, citizen of the United States, residing at New Brunswick, in the county of Middlesex and State of New Jersey, have invented certain new and useful Improvements in Pipe-Stamping Machines; and I do hereby declare the following to be a full, clear, and exact description of the invention, such as will enable others skilled in the art to which it appertains to make and use the same.

My invention relates to improvements in pipe stamping or lettering machines, and has for its object, to provide a device of this kind whereby a smoking pipe of any size may be stamped with the desired initials or insignia.

Another object of my invention is to provide a pipe stamping device whereby any initials may be impressed circumferentially on the pipe bowl, or vertically thereof.

My device is particularly adapted to be used by stores selling pipes and smoking articles, where the initials of the purchaser, or the insignia of his club or fraternity, may be impressed upon the pipe bowl, as desired.

With the above and other objects in view which will appear as the description proceeds, my invention consists in the novel features herein set forth, illustrated in the accompanying drawings and more particularly pointed out in the appended claims.

In the drawings numerals of like character designate similar parts throughout the several views, and in which Fig. 1 is a cross section of my stamping machine, showing the working parts in detail.

Fig. 2 is a front view thereof, showing the rotatable die support.

Fig. 3 is a section taken on line 3—3 of Fig. 1.

Figure 1:
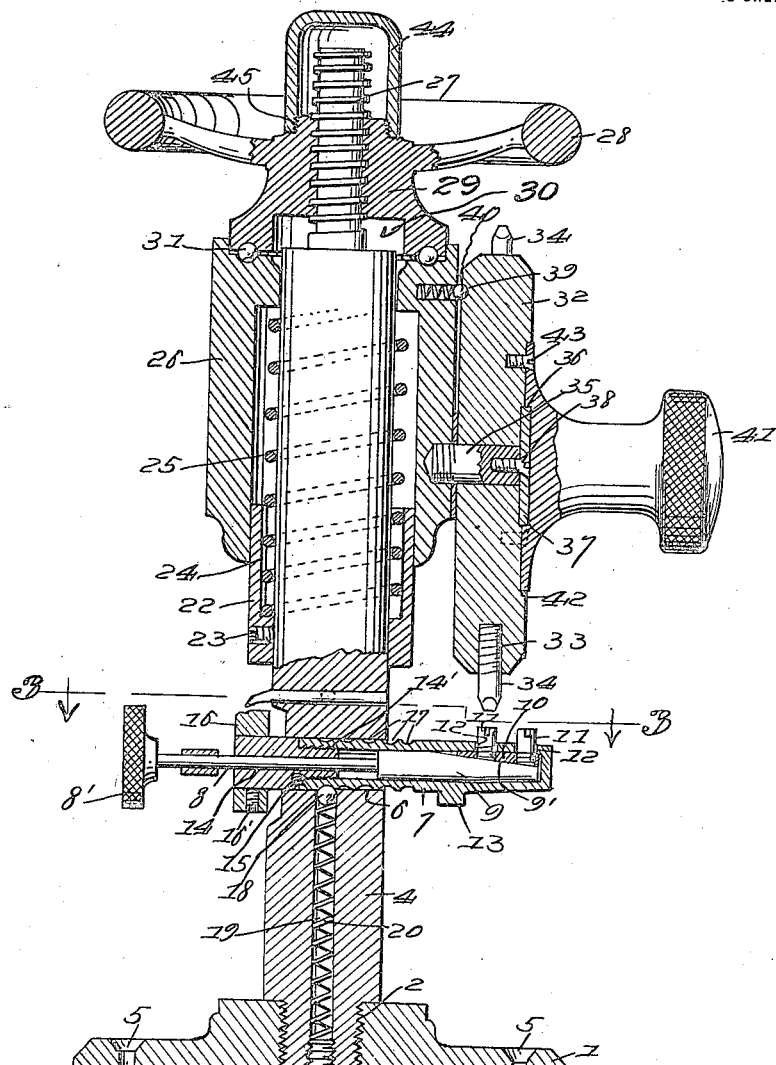

1 designates the base of the machine which is provided with a threaded recess 2 to receive the reduced portion 3, of the main standard 4, said reduced portion being threaded to engage the threads in the recess 2.

The base 1 is provided with recesses 5, to receive screws for securing the machine to a counter or table top.

The standard 4 is cylindrical in shape and is provided with a horizontal recess 6 slightly above the base 1, which is adapted to receive the pipe supporting arm 7. The arm 7 is also cylindrical and is recessed centrally thereof to receive the pipe gripping means, which consists of a rod 8 provided at one end with a lug 9, bevelled at a portion of its length on the upper side thereof as at 9′. Coinciding with this bevelled side 9′ is a bevelled plate 10 which when the rod 8 is moved inwardly and outwardly, will be raised and lowered. The plate 10 is provided with screws 11 which pass through the recesses 12 in the arm 7. These screws hold the plate in place and the heads thereof press against the inner surface of the pipe bowl, and with the shoulder 13, hold the pipe in place, when the rod 8 is pushed inwardly, and will release the same when the rod is pulled outwardly.

The other end of the rod 8 is provided with a handle 8′ to afford a firm grip by the operator of the machine.

The rod 8 is supported by a cylindrical portion 14 which is reduced and threaded at one end, and screwed into the threaded portion 14′ in the arm 7. A set screw 15 is inserted where the arm 7 and the support 14 meet, and secures them together rigidly.

At the end of this supporting portion 14, is provided a collar 16, to prevent the slipping of the arm 7 out of the recess 6, said collar being secured in place by a set screw 16′.

In order to properly space the letters on the pipe bowl horizontally, I provide notches 17 around the surface of the arm 7, which engage a ball 18, located in a central recess 19 of the standard 4. This ball is forced inwardly against the notches 17 by means of a spring 20 which is held in the recess 19 by means of a screw 21 at the lower end of the recess.

Adjustably secured to the standard 4, above the pipe supporting means, is a cylindrical portion 22, held in place by a set screw 23. This portion 22 is recessed at 24, to support the spiral spring 25. A sleeve 26 is slidably mounted on the portion 22, and is held upwardly therefrom by the spring 25.

The upper end of the standard 4 is reduced and threaded at 27, to receive a wheel or handle 28. The central portion 29 of said wheel being recessed as at 30, to receive a portion of the standard 4, when the handle is screwed down and is provided with ball bearings 31 to enable the wheel to be easily turned.

Secured to the front side of the sleeve 26, is a die support 32, which is provided with threaded recesses 33 to receive the dies 34, which may be of any kind desired. On the outer surface of the die support, opposite each die, as shown in Fig. 2, I provide the denomination of the die, to enable the operator to know which die he is using.

This support 32 is rotatably mounted upon the axle 35, which is threaded on its inner end and screwed into the sleeve 26. The support 32 is provided on its outer side with a recess 36, to receive the plate 37 which is secured to the outer end of the axle 35, by means of the screw 38.

On the inner side of the die support, I provide a series of sockets 39 arranged uniformly with the dies, to register with the spring actuated ball 40 in the upper portion of the sleeve 26. By means of this ball and socket arrangement, the die which happens to be at the lower extremity of the support 32, will be held rigidly when the sleeve 26 is forced down.

In order to rotate the support 32, I provide a handle or grip 41, which fits in the recess 42 in the support and is secured in place by the screws 43. At the top of the device I provide a dust cap 44 which is adapted to be screwed on the threads 45 of the wheel or handle 28.

The operation of my machine is obvious. The pipe bowl is slipped over the end of the arm 7, and the rod 8 is pushed inwardly. This actuates the bevelled lug 9 against the plate 10 and forces the screws 11 therein, out against the inner surface of the pipe bowl and with the shoulder 13 pressing against the lower portion of the bowl, the pipe is held firmly in place.

The die support is then turned so as to place the desired die over the pipe at the desired point, and the handle 28 is screwed down, imprinting the die in the outer surface of the pipe bowl.

The handle is then unscrewed and the spring 25 forces the sleeve 26 and support 32 back out of operation. To remove the pipe from the arm 7, the rod 8 is pulled outwardly, releasing lug 9 and the plate 10.

If it is desired to stamp the letters circumferentially of the bowl of the pipe, the arm 7 is turned to place the pipe in the desired position and space the letters, but if it is desired to place them longitudinally thereon, the arm 7 is moved horizontally through the recess 6, when the notches 17 will act against the ball 18, and space the letters uniformly on the pipe bowl.

What I claim and desire to secure by Letters Patent is:—

1. A pipe stamping machine comprising a set of dies mounted in a rotatable support, means for rotating said support, and means for regulating said rotation, a slidably mounted arm adapted to secure a pipe bowl in place, means for imprinting said dies in said pipe bowl, and means for securing the machine in place on a counter or table top.

2. A pipe stamping machine comprising a set of dies mounted in a rotatable support, means for regulating the rotation of said support, said means consisting of a spring actuated ball engaging notches in the die support, a slidably mounted arm provided with recesses circumferentially thereof at a portion of its length, for supporting a pipe bowl, said recesses being adapted to register with a spring actuated ball in the main body of the machine, means for gripping the pipe bowl on said arm, and means for imprinting said dies in said pipe bowl.

3. A pipe stamping machine, as claimed in claim 3, in which the means for gripping the pipe bowl consist of a bevelled lug mounted on a handle in said arm, a bevelled plate provided with a plurality of screws, the heads of which pass through recesses in the arm, said plate when the lug is forced inwardly being raised upwardly and forcing said screws out against the inner surface of the pipe bowl.

4. A pipe stamping machine comprising a standard threaded at the top portion thereof and provided with a base portion, a pipe supporting arm slidably mounted in a recess in said standard above said base portion, means in said arm for gripping a pipe bowl, a cylindrical spring supporting member secured on said standard, a sleeve slidably mounted on said spring supporting member, and a spring adapted to force said sleeve upwardly, a die support rotatably mounted on said sleeve provided with a set of dies, a handle having a threaded portion to register with the threads at the top portion of said standard, said handle engaging said sleeve and provided with bearings, said handle when turned in one direction being adapted to force the sleeve down and set the dies in operation.

In testimony whereof I affix my signature.

ROBERT R. SOLMSON.

Witness:
ALFRED S. MARCH.